(12) United States Patent
Kim et al.

(10) Patent No.: US 11,768,617 B2
(45) Date of Patent: Sep. 26, 2023

(54) MANAGING METHOD FOR FLASH STORAGE AND STORAGE SYSTEM

(71) Applicants: SK hynix Inc., Icheon (KR); WISCONSIN ALUMNI RESEARCH FOUNDATION, Madison, WI (US)

(72) Inventors: Younghyun Kim, Madison, WI (US); Yongwoo Lee, Madison, WI (US); Jaehyun Park, Madison, WI (US); Junhee Ryu, Seoul (KR)

(73) Assignees: SK hynix Inc., Icheon (KR); WISCONSIN ALUMNI RESEARCH FOUNDATION, Madison, WI (US)

( * ) Notice: Subject to any disclaimer, the term of this patent is extended or adjusted under 35 U.S.C. 154(b) by 22 days.

(21) Appl. No.: 17/367,026

(22) Filed: Jul. 2, 2021

(65) Prior Publication Data
US 2023/0004291 A1    Jan. 5, 2023

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0679* (2013.01); *G06F 12/0253* (2013.01); *G06F 2212/7211* (2013.01)

(58) Field of Classification Search
CPC ...... G06F 3/064; G06F 3/0604; G06F 3/0679; G06F 12/0253; G06F 2212/7211
See application file for complete search history.

(56) References Cited

U.S. PATENT DOCUMENTS

| | | | |
|---|---|---|---|
| 6,253,684 B1* | 7/2001 | Summa | B61B 10/025 104/251 |
| 2013/0346812 A1* | 12/2013 | Bahirat | G11C 16/349 714/704 |
| 2014/0157086 A1* | 6/2014 | Sharon | G06F 12/14 711/163 |
| 2014/0189206 A1* | 7/2014 | Sinclair | G06F 12/0246 711/103 |

(Continued)

OTHER PUBLICATIONS

H. Lue et al., "A highly scalable 8-layer 3D vertical-gate (VG) TFT NAND flash using junction-free buried channel BE-SONOS device," in Proc. IEEE Symp. VLSI Technol. (VLSIT), 2010, pp. 131-132.

(Continued)

*Primary Examiner* — Francisco A Grullon (57) ABSTRACT

A managing method for a flash storage includes: sorting a plurality of blocks within the flash storage into precise blocks and imprecise blocks; and managing the sorted blocks as a plurality of free block pools. The management includes performing garbage collection and wear leveling, and the wear leveling is performed based on CEW (Cumulative Effective Wearing), the CEW indicating cumulative cell damage induced by performing a plurality of operations on a specific block. A storage system includes a memory array; and a memory controller sorting a plurality of blocks of the memory array based on error rates, applying erase voltages corresponding to the error rates, respectively, when data stored in the blocks are erased, controlling each of the erase voltages to have a value scaled down from a standard voltage, and performing incremental step pulse programming on one or more of the blocks.

11 Claims, 8 Drawing Sheets

(56) References Cited

U.S. PATENT DOCUMENTS

| | | | |
|---|---|---|---|
| 2014/0189207 A1* | 7/2014 | Sinclair | G06F 12/0246 711/103 |
| 2014/0369124 A1* | 12/2014 | Moon | G11C 16/16 365/185.11 |
| 2014/0372678 A1* | 12/2014 | Moon | G06F 12/0246 711/103 |
| 2018/0374551 A1* | 12/2018 | Hu | G11C 16/3459 |

OTHER PUBLICATIONS

C. Kim et al., "A 512Gb 3b/cell 64-stacked WL 3D V-NAND flash memory," in Proc. IEEE Int. Solid-State Circuits Conf. (ISSCC), 2017, pp. 202-203.
M. Bauer et al., "A multilevel-cell 32 Mb flash memory," in Proc. IEEE Int. Symp. Multiple Valued Logic (ISMVL), 2000, pp. 367-368.
M. Helm et al., "A 128 Gb MLC NAND-flash device using 16 nmplanar cell," in IEEE Int. Solid-State Circuits Conf. Dig. Techn. Papers (ISSCC), 2014, pp. 326-327.
C. Dirik and B. Jacob, "The performance of PC solid-state disks (SSDs) as a function of bandwidth, concurrency, device architecture, and system organization," in Proc. Int. Symp. Comput. Archit. (ISCA), 2009, pp. 279-289.
D. Narayanan et al., "Migrating server storage to SSDs: Analysis of tradeoffs," in Proc. ACM Eur. Conf. Comput. Syst. (EuroSys), 2009, pp. 145-158.
"Micron Launches World's First 1TB Industrial-Grade microSD Card", 2019, Micron, https://www.micron.com/about/newsroom/media-relations/media-kits/1tb-industrial-grade-microsd-card-media-kit.
A. R. Rahiman and P. Sumari, "Solid state disk: A new storage device for video storage server," in Proc. Int. Symp. Inf. Technol. (ISIT), 2008, pp. 1-8.
Y. Kang et al., "A reliability enhanced video storage architecture in hybrid SLC/MLC NAND flash memory," J. Syst. Archit., vol. 88, Aug. 2018, pp. 33-42.
M. Ryu et al., "Impact of flash memory on video-on-demand storage: Analysis of tradeoffs," in Proc. ACM Conf. Multimedia Syst.(MMSys), 2011, pp. 175-186.
J. Lee et al., "Lifetime-aware solid-state disk (SSD) cache management for video servers," Multimedia Syst., vol. 25, No. 6, 2019, pp. 695-708.
J. Jeong et al., "Dynamic erase voltage and time scaling for extending lifetime of NAND flash-based SSDs," IEEE Trans. Comput., vol. 66, No. 4, Apr. 2017, pp. 616-630.
J. Cui et al., "ApproxFTL: On the performance and lifetime improvement of 3-D NAND flashbased SSDs," IEEE Trans. Comput.-Aided Design Integr. Circuits Syst., vol. 37, No. 10, Oct. 2018, pp. 1957-1970.
Q. Li et al., "Leveraging approximate data for robust flash storage," in Proc. Design Autom. Conf. (DAC), 2019, pp. 1-6.
F. Li et al, "ASCache: An approximate SSD cache for error-tolerant applications," in Proc. Design Autom. Conf. (DAC), 2019, pp. 1-6.
L. Han et al., "Rebirth-FTL: Lifetime optimization via approximate storage for NAND flash," in Proc. IEEE Non Volatile Memory Syst. Appl. Symp. (NVMSA), 2019, pp. 1-6.
G. Soundararajan et al., "Extending SSD lifetimes with disk-based write caches," in Proc. USENIX File Storage Technol. (FAST), 2010, pp. 101-114.
G. Wu and X. He, "Delta-FTL: Improving SSD lifetime via exploiting content locality," in Proc. ACM Eur. Conf. Comput. Syst. (EuroSys), 2012, pp. 253-266.
Y. Cai et al., "Flash correct-and-refresh: Retention-aware error management for increased flash memory lifetime," in Proc. IEEE Int. Conf. Comput. Design (ICCD), 2012, pp. 94-101.
L. Shi et al., "Retention trimming for lifetime improvement of flash memory storage systems," IEEE Trans. Comput.-Aided Design Integr. Circuits Syst., vol. 35, No. 1, Jan. 2016, pp. 58-71.

D. Jung et al., "A group-based wear-leveling algorithm for large-capacity flash memory storage systems," in Proc. Int. Conf. Compilers Architecture Synth. Embedded Syst. (CASES), 2007, pp. 160-164.
L.-P. Chang, "On efficient wear leveling for large-scale flash-memory storage systems," in Proc. ACM Symp. Appl. Comput. (SAC), 2007, pp. 1126-1130.
Y. Chang et al., "Endurance enhancement of flashmemory storage, systems: An efficient static wear leveling design," in Proc. Design Autom. Conf. (DAC), 2007, pp. 212-217.
Y. Woo and J. Kim, "Diversifying wear index for MLC NAND flash memory to extend the lifetime of SSDs," in Proc. Int. Conf. Embedded Softw. (EMSOFT), 2013, pp. 1-10.
X. Jimenez et al., "Phoenix: Reviving MLC blocks as SLC to extend NAND flash devices lifetime," in Proc. Design Autom. Test Europe Conf. Exhibit. (Date), 2013, pp. 226-229.
C. Wang and W. Wong, "Extending the lifetime of NAND flash memory by salvaging bad blocks," in Proc. Design Autom. Test Europe Conf. Exhibit., 2012, pp. 260-263.
J. Han and M. Orshansky, "Approximate computing: An emerging paradigm for energy-efficient design," in Proc. IEEE Eur. Test Symp. (ETS), 2013, pp. 1-6.
S. Venkataramani et al., "Approximate computing and the quest for computing efficiency," in Proc. Design Autom. Conf. (DAC), 2015, pp. 1-6.
M. Alioto, "Energy-quality scalable adaptive VLSI circuits and systems beyond approximate computing," in Proc. Design Autom. Test Europe Conf. Exhibit (Date), 2017, pp. 127-132.
S. Mittal, "A survey of techniques for approximate computing," ACM Comput. Survey, vol. 48, No. 4, 2016, pp. 1-33.
M. Alioto et al., "Energy-quality scalable integrated circuits and systems: Continuing energy scaling in the twilight of Moore's law," IEEE J. Emerg. Sel. Topics Circuits Syst., vol. 8, No. 4, Dec. 2018, pp. 653-678.
Y. Kim et al., "Approximate hardware techniques for energy-quality scaling across the system," in Proc. Int. Conf. Electron. Inf. Commun (ICEIC), 2020, pp. 1-5.
A. Sampson et al., "Approximate storage in solid-state memories," in Proc. Int. Symp. Microarchit. (MICRO), 2013, pp. 25-36.
Q. Guo et al, "High-density image storage using approximate memory cells," in Proc. ACM Archit. Support Program. Lang. Oper. Syst. (ASPLOS), 2016, pp. 413-426.
D. Jevdjic et al., "Approximate storage of compressed and encrypted videos," ACM SIGPLAN Notices, vol. 52, No. 4, 2017, pp. 361-373.
J. Greengrass et al., "Not all packets are equal, part I: Streaming video coding and SLA requirements," IEEE Internet Comput, vol. 13, No. 1, pp. 70-75, Jan. 2009.
J. Jeong et al., "Improving NAND endurance by dynamic program and erase scaling," in Proc. USENIX Conf. Hot Topics Storage File Syst. (HotStorage), 2013, pp. 1-5.
Y. Cai et al., "Threshold voltage distribution in MLC NAND flash memory: Characterization, analysis, and modeling," in Proc. Design Autom. Test Europe (Date), 2013, pp. 1285-1290.
W. Wang et al., "Understanding the impact of threshold voltage on MLC flash memory performance and reliability," in Proc. ACM Int. Conf. Supercomput. (ICS), 2014, pp. 201-210.
N. Mielke et al., "Bit error rate in NAND flash memories," in Proc. IEEE Int. Rel. Phys. Symp. (IRPS), 2008, pp. 9-19.
"Stress-Test-Driven Qualification of Integrated Circuits, JESD47G.01.", 2010, JEDEC, http://www.jedec.org.
R.-S. Liu et al., "Optimizing NAND flash-based SSDs via retention relaxation," in Proc. USENIX Conf. File Storage Technol. (FAST), 2012, p. 11.
H. Malepati, "Digital Media Processing: DSP Algorithms Using C," New York, NY, USA: Newnes, 2010.
A. Lottarini et al., "vbench: Benchmarking video transcoding in the cloud," SIGPLAN Notices, vol. 53, No. 2, 2018, pp. 797-809.
J. Bucy et al., "The DiskSim Simulation Environment Version 4.0 Reference Manual", 2008, http://www.pdl.cmu.edu/PDL FTP/DriveChar/CMU-PDL-08-101.pdf.

(56) References Cited

OTHER PUBLICATIONS

A. Tavakkol et al., "MQSim: A framework for enabling realistic studies of modern multiqueue SSD devices," in Proc. USENIX File Storage Technol. (FAST), 2018, pp. 49-65.
Z. Wang et al., "Image quality assessment: From error visibility to structural similarity," IEEE Trans. Image Process., vol. 13, No. 4, Apr. 2004, pp. 600-612.
S. Saadatnejad et al., "LSTM-based ECG classification for continuous monitoring on personal wearable devices," IEEE J. Biomed. Health Informat., vol. 24, No. 2, Feb. 2020, pp. 515-523.
Yongwoo Lee et al., "AxFTL: Exploiting Error Tolerance for Extending Lifetime of NAND Flash Storage", IEEE transactions on computer-aided design of integrated circuits and systems, vol. 39, No. 11, Nov. 2020, pp. 3239-3249.

* cited by examiner

MANAGING METHOD FOR FLASH STORAGE AND STORAGE SYSTEM

BACKGROUND

1. Field

Embodiments relate to a method for effectively managing a flash storage and a flash storage system including the same.

2. Discussion of the Related Art

Recently, storage technology for a memory (e.g., a flash memory) has been developed to store multi-bit binary information in one memory cell. Commercially, a memory cell capable of storing 2-bit binary information therein is referred to as an MLC (Multi Level Cell), and a memory cell capable of storing 3-bit binary information therein is referred to as a TLC (Triple Level Cell). In a broad sense, the MLC may also be used to collectively represent memory cells each capable of storing 2 or more-bit binary information therein. Since a multi-bit flash memory is used as a NAND flash memory, the multi-bit flash memory has a capacity of storing a larger amount of data in the same silicon area. Therefore, an SSD (Solid State Drive) using the multi-bit flash memory has similar performance in price competitiveness to an HDD (Hard Disk Drive), and thus is gradually replacing the HDD. Furthermore, the multi-bit NAND flash memory already has a considerable market share in the field of data storages of personal computing systems or mobile devices.

Figure 1:
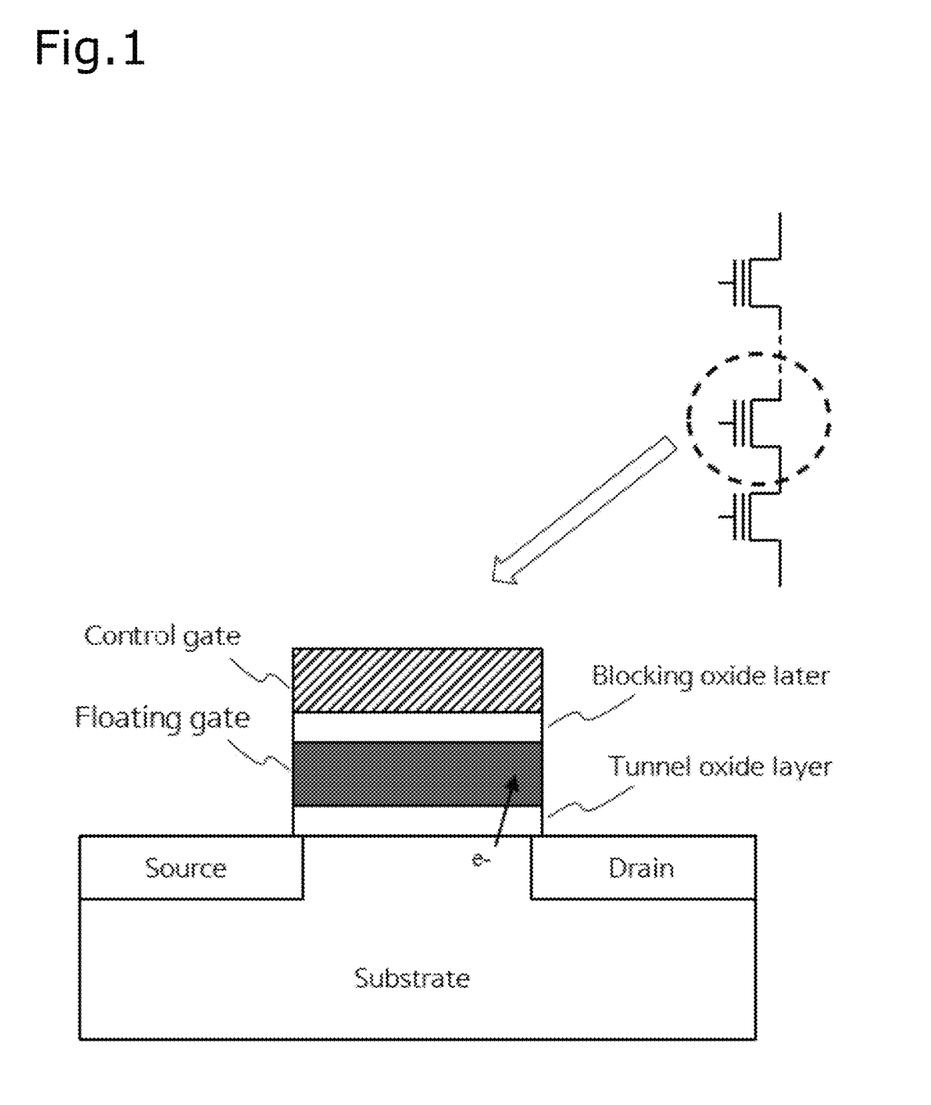
FIG. 1 is a cross-sectional view illustrating a flash memory cell.

While a volatile memory such as DRAM performs two kinds of operations such as read and write operations, a flash memory further requires an erase operation. This results from the physical characteristics of flash memory cells. In order to store information in a specific bit, a flash memory needs to perform an erase operation in advance. When an erase operation is not performed in advance, a flash memory may not store binary information. That is, while a write operation in a volatile memory indicates an over-write operation of writing information over information stored therein, a write operation in a flash memory indicates an operation of writing information after erasing information stored at the moment. Hereafter, the write operation in a flash memory is also referred to as programming, and the erase operation in the flash memory is also referred to as erasing. When programming and erasing operations in a flash memory cell are repeated, a tunnel oxide layer of a memory cell illustrated in FIG. 1 gradually wears due to stress applied by electrons, and thus the insulating performance of the memory cell is reduced. Therefore, the programming performance and the erasing performance of the memory cell are also gradually reduced. For this reason, the endurance of the flash memory is determined by P/E (Program/Erase) cycles in which the flash memory can perform programming/erasing without an error. Conventionally, an SLC (Single Level Cell) has been commercially required to endure approximately 100,000 P/E cycles for the past few decades. However, the recent TLCs can endure only 3,000 P/E cycles or less, and some applications guarantee only 1,000 P/E cycles or less.

When a flash memory cell exceeds the P/E cycle limit, the flash memory cell may contain an error which cannot be corrected even through ECC (Error Correction Code). In this case, the flash memory cell cannot be used any more. Conventional approaches to manage P/E cycles more efficiently include evenly distributing P/E cycle counts among blocks within a flash memory (wear leveling) or reusing bad blocks. Furthermore, a method to introduce a cache to absorb write requests from a system or application program, a method to exploit the locality of data, or a method to avoid a refresh operation of recently written data has also been used. Wear leveling ensures substantially all blocks degrade at an even rate to prevent some blocks from becoming prematurely unusable while others are healthy, thereby extending the lifetime of a flash memory. Reusing bad blocks includes reusing worn-out multi-bit cells as single-bit cells and reusing good pages in worn-out blocks.

The above-described existing techniques may extend the lifetime of a flash memory or a flash storage including a flash memory. However, even if there is a single uncorrectable error in a block, the block may be considered worn-out. Such a problem may be overcome by discarding a bad block or mapping a bad cell of the block to an SLC. In this case, the storage capacity of the flash memory or the flash storage is inevitably reduced. Therefore, the above-described existing techniques may not be suitable for some applications (e.g., video applications) in which the quality of video is allowed to be degraded to a certain degree, because a few errors are allowed in data.

In order to understand the core technical idea of the present disclosure, some background knowledge on video compression may be helpful. The background knowledge will be described with reference to FIG. 2.

Figure 2:
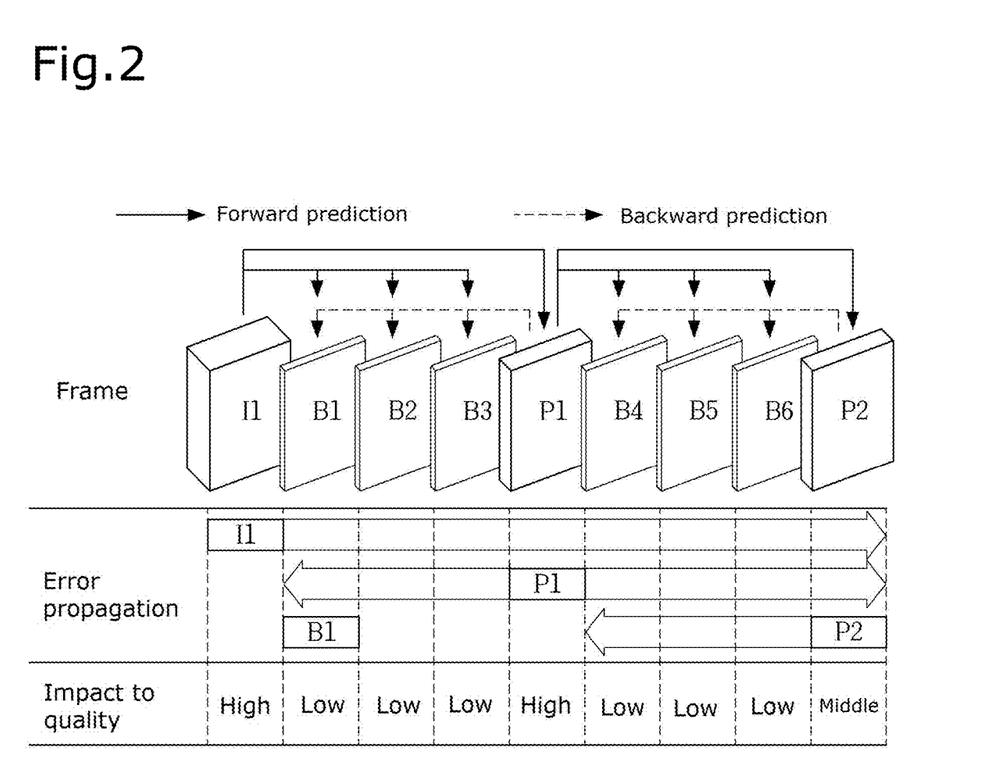
FIG. 2 illustrates correlations among MPEG frames and error propagation and compression ratios in the MPEG frames.

Video data are so voluminous that compression is a must for efficient storage and transmission. Various video compression algorithms have been proposed for decades, driven by the growing demand for high-resolution videos and enabled by increasing computing power. Most algorithms heavily rely on motion estimation to identify and eliminate redundancy between frames. For example, as illustrated in FIG. 2, video frames compressed by a well-known MPEG (Motion Picture Experts Group) codec are encoded into either I frames, P frames, or B frames. I frames are intra-coded frames that are treated as still images. The compression of I frames exploits spatial redundancy within each frame, but does not exploit temporal redundancy between frames. Therefore, the compression ratio of I frames is relatively low compared to predictive frames (P and B frames) that exploit temporal redundancy as well. However, since I frames are used as a reference frame for decoding other predictive frames, I frames should periodically appear in the stream to prevent temporal propagation of errors. P frames are predictive-coded frames that only contain the difference from a proceeding I frame or P frame. Because temporally adjacent frames are similar to each other, the difference can be encoded using much smaller data size than the original frames, typically 20% to 70% of the size of an I frame. B frames are bidirectional predictive-coded frames that exploit temporal redundancy more aggressively by referencing both proceeding and following I, P, or B frames. B frames provide an even higher compression ratio, and the size of a B frame is typically only 5% to 40% of that of an I frame. Despite the high compression ratio, however, a video cannot be encoded only into P frames and B frames because the temporal propagation of errors can be stopped only by I frames that are self-contained.

This interframe dependency naturally introduces the unequal importance of encoded frames. FIG. 2 illustrates one I frame, two P frames, and six B frames and their dependency due to predictive coding. In FIG. 2, the I frame is not dependent on any frame because the I frame is a self-contained image. However, all the following P frames and B frames are dependent on this I frame, because they are predictive-coded using the I frame as a reference. Therefore, errors in the I frame will affect not only itself but also all other subsequent frames. On the other hand, no frames are dependent on the B frames in the example of FIG. 2. The impact of errors is illustrated as a prediction direction in FIG. 2, i.e., forward precision or backward precision.

The impact of errors in a B frame will be limited to the frame and will not propagate to other frames. In FIG. 2, errors in frames I1, P2, and B1 will affect nine, four and one frames, respectively. The impact is represented by error propagation in FIG. 2. Although described below in detail, embodiments of the present disclosure exploit the frame-level unequal importance to distinguish data, but the technical idea of the present disclosure is not limited only to any specific data type or any specific scheme to evaluate the importance of the data.

SUMMARY

Various embodiments are directed to a managing method for a flash storage, which can extend the lifetime of a flash storage that sorts blocks of a flash storage according to erase modes, and allocates blocks based on error rates, in order to exploit a flash memory, and a system using the same.

In an embodiment, a managing method for a flash storage, the method comprising: sorting a plurality of blocks within the flash storage into precise blocks and imprecise blocks; and managing the sorted blocks as a plurality of free block pools. The management is performed by a garbage collection and wear leveling, and the wear leveling is performed based on CEW (Cumulative Effective Wearing), the CEW indicating cumulative cell damage induced by performing a plurality of operations on a specific block.

In an embodiment, a storage system comprising: a memory array; and a memory controller configured to: sort a plurality of blocks of the memory array based on error rates; apply erase voltages corresponding to the error rates, respectively, when data stored in the blocks are erased; control each of the erase voltages to have a value scaled down from a standard voltage; and perform incremental step pulse programming on one or more of the blocks.

In accordance with the embodiment of the present disclosure, the managing method may adopt the shallow erase technique and the ISPP technique in order to reduce damage caused by erase, which significantly influences storage in a flash storage including a flash memory (e.g., a NAND flash memory), and to address issues accompanied by the damage, and algorithms corresponding to the shallow erase technique and the ISPP technique are developed to efficiently extend the lifetime of the flash storage using a NAND flash memory. The managing method may reduce cell damage across steps over the lifetime of the flash storage.

DETAILED DESCRIPTION

Hereafter, embodiments of the present disclosure will be described in detail with reference to the accompanying drawings such that various embodiments of the present disclosure can be carried out by those skilled in the art to which the present disclosure pertains. Among reference numerals marked on the respective drawings, like reference numerals represent the same components.

In describing the present disclosure, detailed descriptions for related publicly-known technologies may be omitted in order not to unnecessarily obscure subject matters of the present disclosure.

The terms such as first and second may be used to describe various components, but the components are not limited by the terms, and the terms are used only to distinguish one component from another component.

The terms used in this specification will be briefly described as follows.

'Flash storage' may refer to a storage including a flash memory among nonvolatile memories.

'Memory cell' or 'cell' may refer to one unit element capable of storing binary information therein.

'Flash translation layer' or 'FTL' may refer to middleware for sector-block translation in order to use a block-based flash memory in a sector-based system or application program.

In the present disclosure, an expression 'deeply' in a program operation or erase operation may indicate that a standard voltage or normal voltage which does not cause an error is applied. However, an expression 'shallowly' in a program operation or erase operation may indicate that a weak voltage is applied to such an extent to endure or allow a few errors, in order to reduce damage to a memory cell. 'Shallow' voltage may be used to indicate a voltage lower than 'deep' voltage. Furthermore, it should be noted that various numerical values presented throughout this specification are only used for convenience of description, or used for an experiment or simulation for verifying the effects of the present disclosure, and the technical ideas of the present disclosure are not limited thereto.

Error Tolerance-Aware Block Allocation

Figure 3:
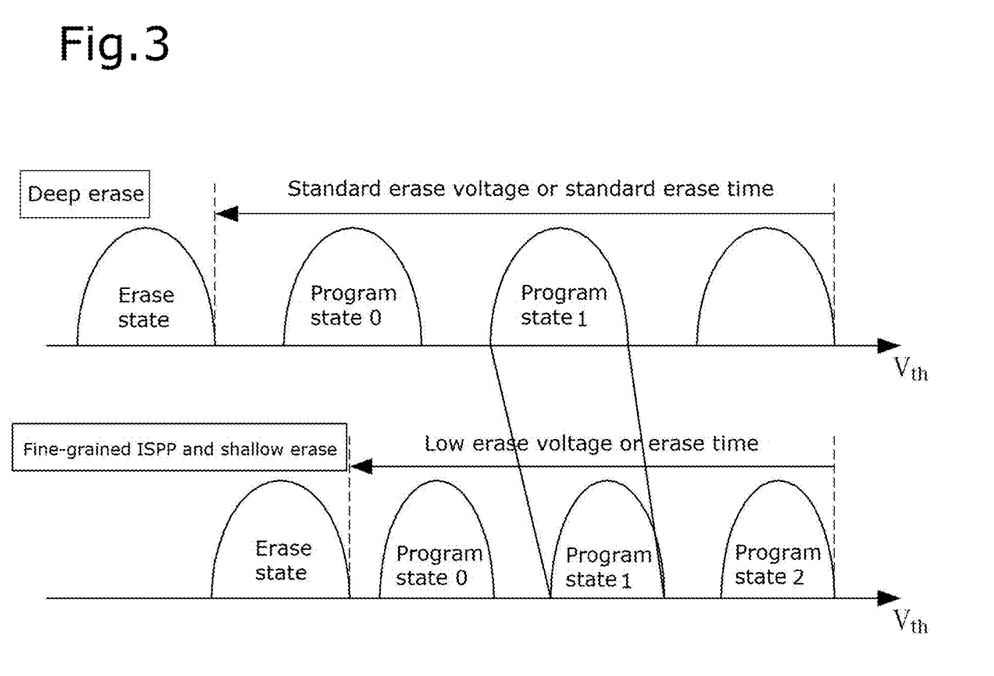
FIG. 3 illustrates shallow erase and ISPP (Incremental Step Pulse Programming) in accordance with an embodiment of the present disclosure.

One of aspects of embodiments of the present disclosure relates to a method capable of improving the lifetime of a storage using a flash memory by selectively applying shallow erase to a block having error-tolerant data stored therein. More specifically, a shallow erase technique is adopted to manage blocks having different erase modes. Furthermore, while ISPP (Incremental Step Pulse Programming) is more rapidly and normally performed on a block which has been erased shallowly, data matched with an error tolerance level is allocated to the corresponding block. For example, ISPP may be performed on a first block (e.g., an imprecise block) having been erased shallowly during a first time interval that is shorter than a second time interval during which ISPP is performed on a second block (e.g., a precise block) having been erased deeply. As shown in FIG. 3 which comparatively illustrates applying a shallow erase voltage and a deep erase voltage, the interval between voltage distributions of program states by shallow erase and fine-grained ISSP is narrower than the interval between voltage distributions of program states by deep erase. For reference, in FIG. 3, memory cells each capable of storing 2-bit binary information therein are taken as example for description.

Figure 4:
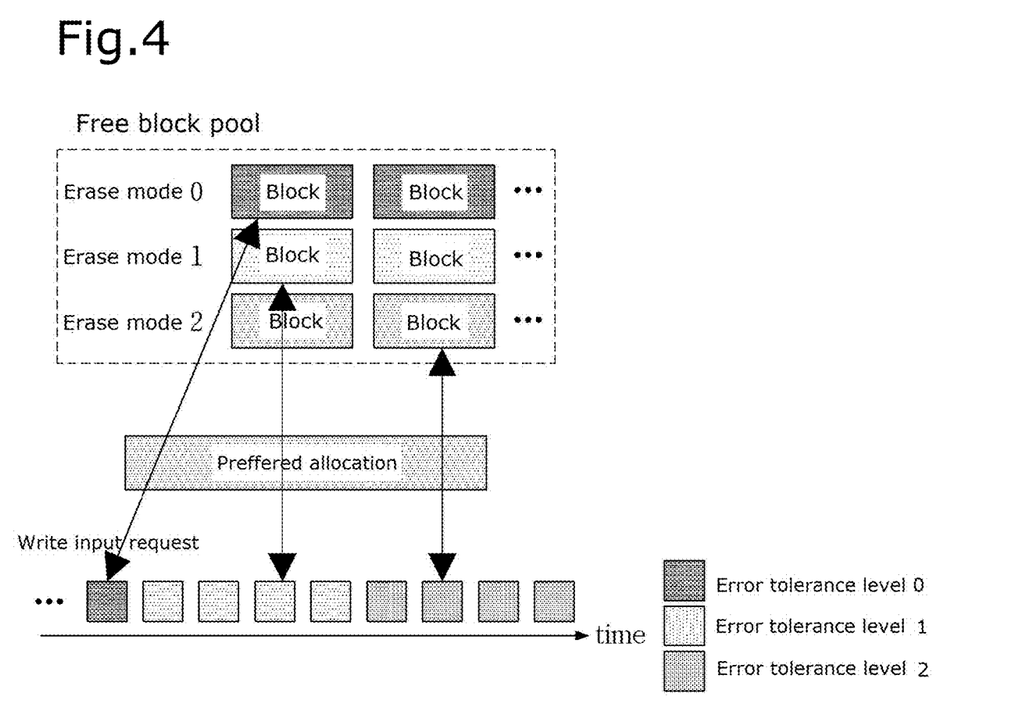
FIG. 4 illustrates block allocation for each erase mode.

When a first block of a flash memory is deeply erased, the first block is referred to as a precise block, and when a second block of the flash memory is shallowly erased, the second block is referred to as an imprecise block. Since different levels of erase voltages have been used in the respective blocks, the blocks have different error rates. When a write request is received from a system, a controller or application program which controls an operation of the flash memory, a block which meets the error tolerance of data is allocated. Error-intolerant data should be allocated only to a precise block, while error-tolerant data can be allocated to either a precise block or an imprecise block. Using a precise block may be avoided as much as possible since it is more costly in terms of EW (Effective Wearing). Block allocation is performed for each erase mode according to the precision (e.g., an error tolerance level) of each block in a free block pool. For example, as illustrated in FIG. 4, a first erase mode for a precise block which tolerates no errors (e.g., error tolerance level 0) is represented by erase mode 0, a second erase mode for an imprecise block with a middle error tolerance level (e.g., error tolerance level 1) is represented by erase mode 1, and a third erase mode for an imprecise block which tolerates relatively many errors (e.g., error tolerance level 2) is represented by erase mode 2. FIG. 4 illustrates that the deep erase and the shallow erase divided into two steps correspond the erase modes 0, 1 and 2, respectively. Although will be described below, a shallow erase voltage lower than a deep erase voltage may be scaled down to an extent in order to perform such an erase method.

Figure 5:
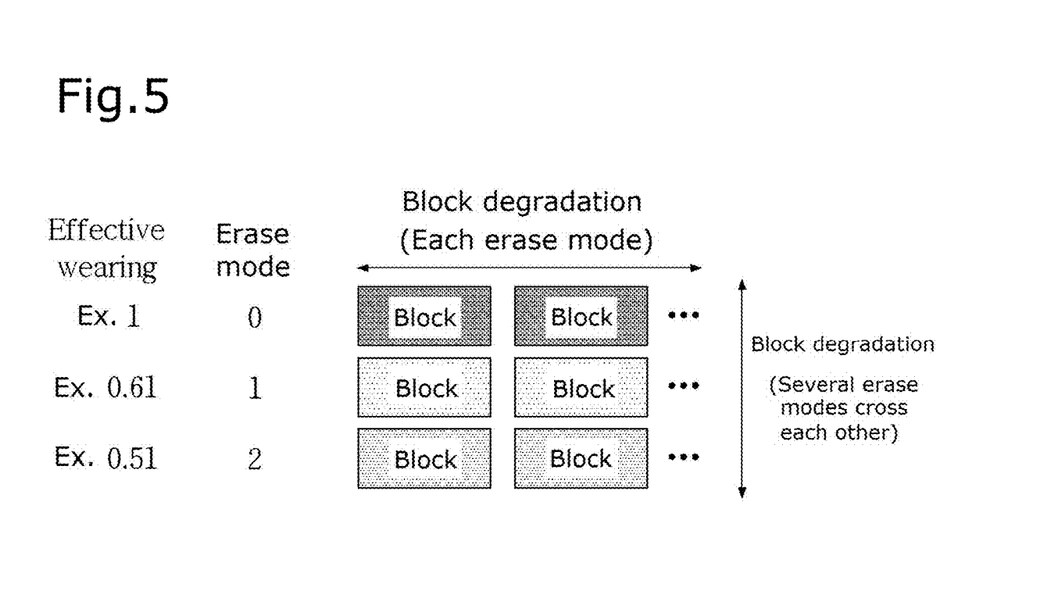
FIG. 5 illustrates block degradation and effective wearing.

Whenever a flash memory cell is erased, a tunnel oxide layer thereof gradually wears. During deep erase and shallow erase, different impacts are applied to the tunnel oxide layer because voltages having different magnitudes are applied during deep erase and shallow erase. In an embodiment, effective wearing (EW) indicates the cell damage that is induced by an erase operation depending on an erase voltage and has a value equal to the erase voltage normalized with a standard erase voltage used in deep erase. When shallow erase and deep erase are represented by EW, the EW of shallow erase may be less than 1 under the supposition that the EW of deep erase is normalized to 1. In consideration of normalization, CEW (Cumulative Effective Wearing) may be calculated as follows. The CEW may indicate cumulative cell damage induced by performing a plurality of operations (e.g., a plurality of erase operations) on a specific block. For example, if a block is deep-erased two times and shallow-erased five times with an EW of 0.5, the CEW of the block is 5.5 (=2×1+5×0.5). That is, deep erase and shallow erase have different weights (e.g., 1 and 0.5), and shallow erases may be divided into a plurality of steps. FIG. 5 illustrates examples in which EWs given to blocks for the respective erase modes 0, 1, and 2 are set to 1, 0.61, and 0.51, respectively.

Erase Mode-Aware Garbage Collection and Wear Leveling

Figure 6:
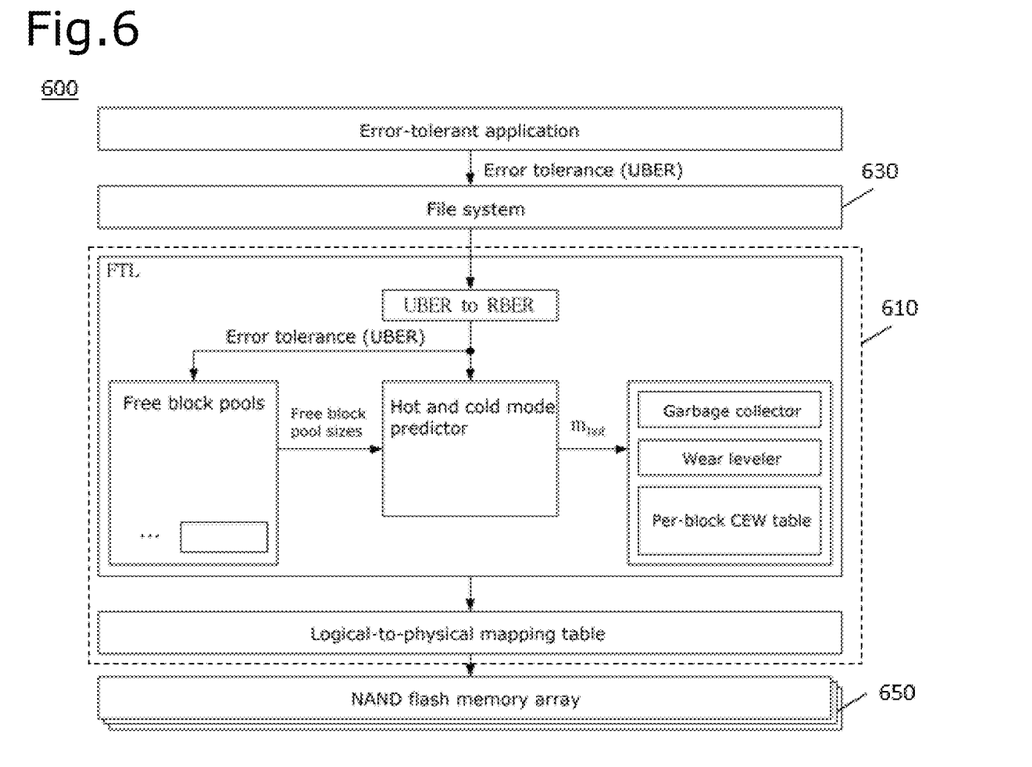
FIG. 6 schematically illustrates a system in accordance with an embodiment of the present disclosure.

Hereafter, erase mode-aware garbage collection and wear leveling, which are other features of embodiments of the present disclosure, will be described. In embodiments of the present disclosure, garbage collection and wear leveling schemes are designed to take into account multiple erase modes and different cell damages induced by the erase modes. The schemes jointly manage FBPs (Free Block Pools). That is, the schemes are operated to maintain the required numbers (or target numbers) of precise blocks and imprecise blocks while ensuring even block wearing. In particular, block wearing is evaluated in terms of CEW rather than P/E cycle counts. FIG. 6 illustrates the overview of an AxFTL (Approximate Flash Translation Layer) with functional blocks in accordance with an embodiment of the present disclosure. Suppose that all write requests each are marked with an error tolerance determined by a controller or application. The AxFTL in accordance with the embodiment illustrated in FIG. 6, manages multiples FBPs, one for each error tolerance level, and selects a free block from one of the FBPs which meets the error tolerance requirement. When a block is erased, the erase mode is determined based on the current size of the FPBs and the recent request history to minimize extra erase. Garbage collection and wear leveling are performed based on this determination as well as the CEW of the blocks.

The system 600 shown in FIG. 6 includes a memory controller 610, a file system 630, and a memory array 650 (e.g., NAND flash memory array). The memory controller 610 may refer to a hardware controller as well as firmware and software controller. In an embodiment, the memory controller 610 may include an internal memory (not shown) storing the AxFTL and a core (not shown) executing the AxFTL. For example, the core may include a micro control unit (MCU) or a central processing unit (CPU). In another embodiment, the AxFTL may be loaded on a dedicated memory (not shown) provided within the core, rather than the internal memory. The AxFTL according to an embodiment of the present disclosure may be implemented as an application program, and the memory controller 610 may operate using the application program. In an embodiment, the memory controller 610 may include the application program. In another embodiment, the file system 630 may include the application program.

Erase Voltage Scaling and Error Modeling

Figure 7:
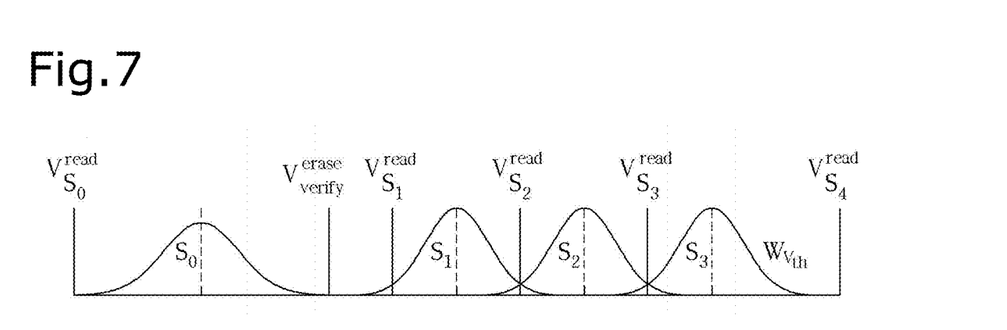
FIG. 7 illustrates distributions of threshold voltages.

Hereafter, a method in accordance with an embodiment of the present disclosure, which models the scaling of erase voltage and a long-term impact to data retention error, will be described. Voltage scaling may be performed for shallow erase. Since voltage for shallow erase will be lower than voltage for deep erase, the magnitude of the voltage for shallow erase is scaled to a value of 0 to 1, when the voltage for deep erase is normalized to 1. It may be assumed that the threshold voltage distributions of cell data stored at multi levels statistically follow a Gaussian distribution as illustrated in FIG. 7, even though the threshold voltage distributions are not perfectly symmetric. FIG. 7 illustrates that an error occurs because some tails of the threshold voltage distributions of states $S_1$ to $S_3$ overlap each other. It should be noted that FIG. 7 is exaggerated for clear illustration of errors. The voltages marked in FIG. 7 represent reference voltages for a read operation and a voltage for verifying erase. The scaling is subjected to the following process. First, the probability density function of the threshold voltages is calculated. The probability density function is given by:

$$P(v) = \sum_{k=1}^{K-1} P_S(S_k) \frac{1}{\sigma_k \sqrt{2\pi}} \exp\left(\frac{-(v-\mu_k)^2}{2\sigma_k^2}\right). \quad \text{Equatoion 1}$$

In Equation 1, K is the number of states, $P_S(S_K)$ is the probability of state $S_K$, and $\mu_k$ and $\sigma_k$ are the mean and the standard deviation of state $S_K$.

Second, an RBER (Raw Bit Error Rate) is calculated from the calculated probability density function. The error rate indicates that the tails of the probability density functions, which lie outside the reference voltage boundaries, overlap each other in FIG. 7, and RBERp due to program error may be calculated from the probability density function of threshold voltages as expressed by Equation 2 below:

$$RBER_p = \sum_{k=1}^{K-1} \left( \int_{-\infty}^{V_{S_k}^{read}} P_k(v)dv + \int_{V_{S_{k+1}}^{read}}^{\infty} P_k(v)dv \right). \quad \text{Equation 2}$$

Third, when data is retained for a long time, charges stored in the floating gate of a memory cell gradually leak to increase program errors. Thus, this needs to be considered. It is natural that an error occurs due to data retention. The retention error is initially 0, and gradually increases over time. That is, the retention error becomes a function of time. Typically, retention error dominates program error by order of magnitude typically by up to 450 times after the maximum retention time of one year, and the RBER increases approximately 450 times. Specifically, although the retention error is initially zero and gradually increases over time, the worst-case retention error that is about 450 times as great as RBERp may be assumed at all times for conservative error estimation. Thus, the RBER that is the sum of RBERp and the worst-case retention error may be expressed as Equation 3 below:

$$RBER \approx 450 \cdot RBERp \quad \text{Equation 3.}$$

Fourth, as a result of shallow erase that applies a low erase voltage, the verify voltage for verifying erase is shifted to the right by Equation 4 below:

$$\Delta W_{V_{th}} = \alpha_c \cdot V_{nom}^{erase} \cdot (1 - rv_e) \quad \text{Equation 4.}$$

In Equation 4, $V_{nom}^{erase}$ is the nominal erase voltage, $rv_e$ is the erase voltage scaling factor between 0 and 1, and $\alpha_c$ is a scaling parameter required when the shifted value is numerically scaled. Therefore, the distribution centers $\mu_k$ of all the threshold voltages $v_{th}$ and the reference voltages $V_{S_k}^{read}$ should be shifted to the right accordingly to maximize the margins between adjacent states. The shifted distribution centers and the shifted reference voltages are represented by $\mu_k'$ and $V_{S_k}^{read'}$, respectively. Fifth, the distances between the distribution centers $\mu_k$ and the reference voltages $V_{S_k}^{read}$ are scaled by the same scaling factor $rv_e$, in order to set the new distribution center as Equation 5 below:

$$\mu_k' = \mu_k + (V_{S_k}^{read} - \mu_k) \cdot rv_e \quad \text{Equation 5.}$$

On the other hand, the distribution widths of the threshold voltages remain unchanged since the same ISPP step voltage $V_p$ is used, and the width of the threshold voltage is proportional to $V_p$. The reduced distance between reference voltages and the unchanged width of the threshold voltage result in a higher RBER. Therefore, $V_{S_k}^{read}$ may be numerically optimized from Equations 1 and 2 with new $\mu_k'$ to minimize the RBER.

Sixth, in order to promote convenience when applying the contents of the present disclosure, the RBER is mapped or inversely mapped to UBER (Uncorrectable Bit Error Rate) as expressed by Equation 6 below:

$$UBER = \frac{\sum_{k=t+1}^{i} \binom{i}{j} \cdot RBER^j \cdot (1-RBER)^{i-j}}{l}. \quad \text{Equation 6}$$

In Equation 6, l is the codeword length, and t is the error correction capability of the ECC. The above-described AxFTL model is not only used to determine the scaling factor $rv_e$, but also used to evaluate the effect of embodiments of the present disclosure.

Specific Example of Error Tolerance-Aware Block Allocation

Figure 8:
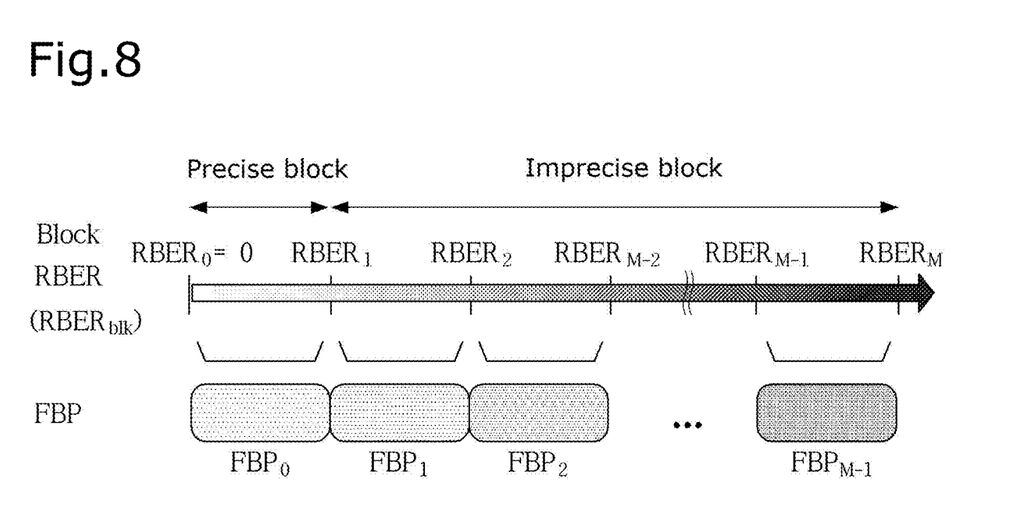
FIG. 8 illustrates allocation of precise blocks and imprecise blocks in a free block pool.

To take advantage of varying error tolerance of data, the AxFTL in accordance with an embodiment of the present disclosure performs error tolerance-aware block allocation that maps a free block to a write request based on the error tolerance. The AxFTL in accordance with an embodiment maintains M free block pools (FBPs), $FBP_0$ through $FBP_{M-1}$, grouped by their RBER. Each FBP is a pool of free blocks that are erased by one of M erase modes, resulting in substantially the same RBER as modeled in the above descriptions. Specifically, for m=0, 1, . . . , M−1, $FPB_m$ is a pool of free blocks with a RBER of $RBER_{blk}$ under a condition of ($RBER_m < RBER_{blk} \leq RBER_{m+1}$). Here, $RBER_0 < RBER_1 < \ldots < RBER_M$ are the preset error tolerance boundaries. Among them, $FBP_0$ is the pool of precise free blocks with virtually zero RBER. That is, $FBP_0$ is bounded by $RBER_0=0$ and very small RBER1. FIG. 8 illustrates the architectures of FBPs which are divided by the RBER according to such a principle.

A write request's UBER tolerance is first converted into the corresponding RBER tolerance, denoted by $RBER_{app}$, based on Equation 6. When a write request with a RBER tolerance of $RBER_m < RBER_{app} \leq RBER_{m+1}$ is received, this write request is defined as 'a write request of Mode m' that demands a free block of erase mode m. To the write request of Mode m, a free block is allocated based on the following priorities.

1) If $N(FBP_m) > 0$, where $N(FBP_m)$ is the number of free blocks in $FBP_m$, a free block is allocated from $FBP_m$.

If $N(FBP_m) \leq N_{min}$ after allocation, where $N_{min}$ is the minimum number of free blocks for garbage collection, garbage collection is invoked for $FBP_m$.

2) If $N(FBP_m)=0$, a free block from the next available highest FBP is allocated, and garbage collection is invoked for $FBP_m$.

3) If $N(FBP_i)=0$ for all $0 \leq i \leq m$, i.e., if there exists no free block that meets the error tolerance requirement, garbage collection is invoked to replenish $FBP_m$ with a free block, which is then allocated to the data.

The selection of a block within an FBP can be done by any conventional free block selection criteria. In an embodiment, each FBP keeps its free blocks sorted by CEW, and the one with the lowest CEW located at the head is selected.

The above-mentioned priority ensures that the most error-prone free block is preferred as long as it does not violate the application's error tolerance, which is the least costly in terms of storage lifetime. 'Erase-on-demand' is avoided whenever possible to minimize the performance degradation caused by maintaining multiple FBPs.

Hot and Cold Mode Prediction

To facilitate the preferred block allocation and avoid the non-preferred block allocation described above, it is desirable to maintain the size of the FBPs so that none of them become prematurely depleted before the storage is full. The AxFTL in accordance with an embodiment of the present disclosure proactively manages the number of free blocks in the FBPs based on the recent request history and the number of remaining free blocks in each FBP. Whenever a block is being erased, the most demanded and the least demanded erase modes are determined. The sufficiency and the deficiency of free blocks in each mode are measured by the ratio between the number of recent write requests and the number of remaining free blocks. Specifically, for Mode m, the ratio is defined as Equation 7 below:

$$R_m = \frac{W_m}{N(FBP_M) - N_{min}}.$$  Equation 7

In Equation 7, $W_m$ is the number of recent write requests of Mode m, and $N_{min}$ is the minimum number of free blocks for garbage collection.

The hot mode, $m_{hot}$, and the cold mode, $m_{cold}$, are the modes that are most demanded and least demanded, respectively, which are defined as Equation 8 below:

$$m_{hot} = \arg_m \max R_m, \quad m_{cold} = \arg_m \min R_m$$  Equation 8.

In case that the above-described ratios (e.g., $R_0$ to $R_{M-1}$) are equal to one another, the hot and cold modes are selected based on the size of FBPs, which is another indirect measure of demand for write request modes. During garbage collection and wear leveling, which will be described below, $m_{hot}$ and $m_{cold}$ are used to determine which erase modes should be used and how the free blocks should move among FBPs.

Figure 9:
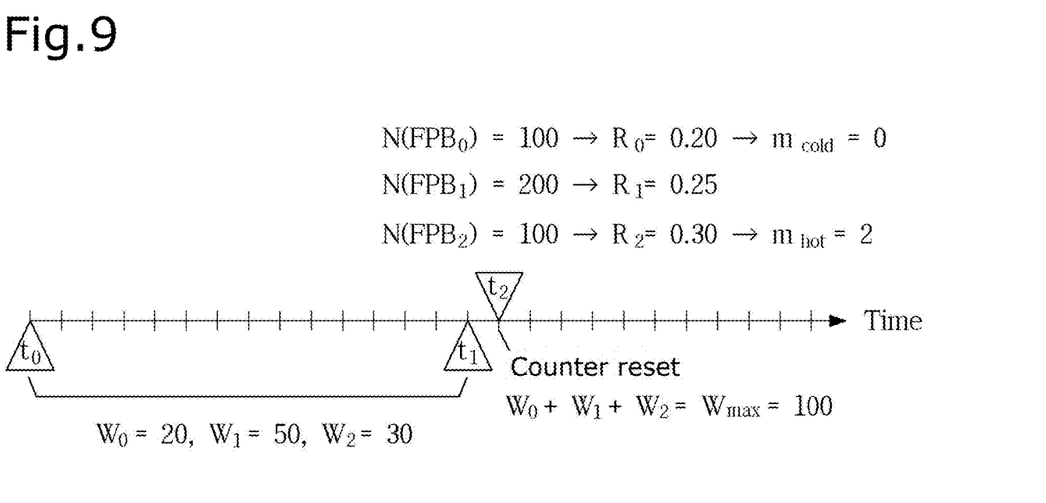
FIG. 9 illustrates an example of counter reset.

To obtain $W_m$ efficiently, the number of write requests of Mode m is counted until the sum of the counters reaches $W_{max}$. When the sum of the counters reaches $W_{max}$, the counters are reset, and the counter values are used as $W_m$ until the next counter reset. FIG. 9 illustrates how $m_{hot}$ and $m_{cold}$ are selected in an example where M=3, $W_{max}$=100, and $N_{min}$=0. In FIG. 9, at time $t_0$, three counters are reset. Between $t_0$ and $t_1$, 100 writes requests are received, including 20, 50, and 30 requests in Modes 0, 1, and 2, respectively, i.e., $W_0$=20, $W_1$=50, and $W_2$=30. Since $W_0+W_1+W_2=W_{max}$, the counters are reset at $t_2$, and these values are used until the next counter reset. An erase occurs at $t_2$ before the next count reset, at which the size of three FBPs are 100, 200, and 100, respectively. $R_0$, $R_1$, and $R_2$ are calculated as in Equation 7. As a result, the most demanded write mode is Mode 2 (i.e., $m_{hot}$=2), and the least demanded write request mode is Mode 0 (i.e., $m_{cold}$=0).

Erase Mode-Aware Garbage Collection

Garbage collection is invoked to replenish an FBP with a new free block when the number of available free blocks in the FBP falls below a certain threshold. Unlike in conventional FTLs, garbage collection in the AxFTL in accordance with an embodiment of the present disclosure involves the selection of a victim mode in addition to the selection of a victim block because garbage collection is one mechanism to address the possible imbalance between the demand and supply of free blocks in each mode. Specifically, as a result of garbage collection, a block in a less demanded mode should be freed and moved to the most demanded mode.

According to an embodiment of the present disclosure, Algorithm 1 in Table 1 shows the detailed procedure of the erase mode-aware garbage collection. This procedure is invoked when $N(FBP_m)<N_{min}$ for any $FBP_m$ due to data allocation, and whenever it is invoked, by definition, $m_{hot}$ is the mode whose free block is most lacking. First, the mode with the lowest $R_m$, i.e., $m_{cold}$, which indicates the least demand for free blocks, is considered as the victim mode. Subsequently, the mode with the next lowest $R_m$ (lines 2-7) is considered. The used block pool (UBP) B of the considered mode, which is a pool of blocks that have at least one non-free page, is searched to find the block that has the most invalid pages (lines 3-5). Then, the function NUMINVPAGE(x) returns the number of invalid pages in block x, and NUMINVPAGE(NULL) is defined as zero. The selected $b_{victim}$ is the block that has at least one non-free page in the least demanded mode. If $b_{victim}$ has any valid pages that have to be preserved, the valid pages are migrated to a precise (Mode 0) block. That is because migration to an imprecise block will introduce additional errors that will accumulate over time and eventually violate the error tolerance of the data (lines 8 and 9). The function NUMVALPAGE(x) returns the number of valid pages in block x. Finally, $b_{victim}$ is erased in Mode $m_{hot}$ and moved into $FBPm_{hot}$ (lines 10 and 11).

Figure 10:
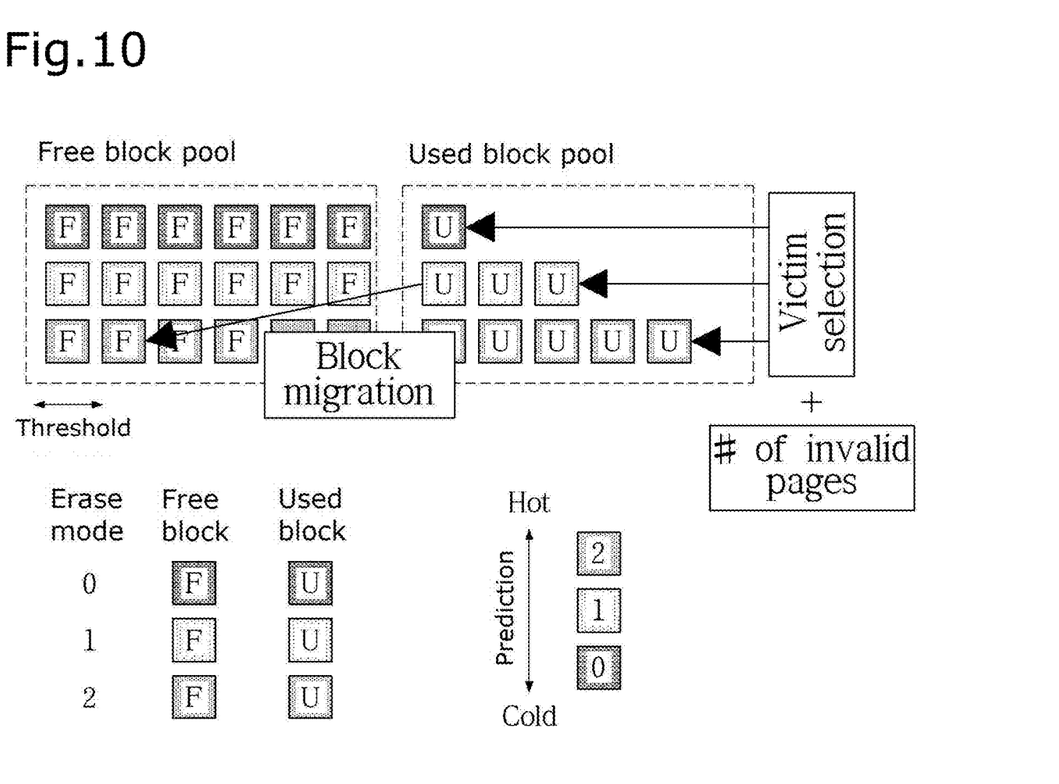
FIG. 10 illustrates block migration in a free block pool and a used block pool.

FIG. 10 illustrates an example of garbage collection in which a victim block is selected by the above-described Algorithm 1 and migrated to a free block pool.

TABLE 1

Algorithm 1: Erase Mode-Aware Garbage Collection

| | |
|---|---|
| 1 | $b_{victim} \leftarrow$ NULL |
| 2 | for each UBP B sorted by $R_m$ in ascending order do |
| 3 | \| for each block b ∈ B do |
| 4 | \| \| if NUMINVPAGE($b_{victim}$) < NUMINVPAGE(b) |
| | \| \| then |
| 5 | \| \| \| $b_{victim} \leftarrow$ b |
| 6 | \| if $b_{victim} \neq$ NULL then |
| 7 | \| \| break |
| 8 | if NUMVALPAGE($b_{victim}$) > 0 then |
| 9 | \| MIGRATE($b_{victim}$, Mode 0) |
| 10 | ERASE($b_{victim}$, $m_{hot}$) |
| 11 | Move $b_{victim}$ into $FBP_{m_{hot}}$ |

Erase Mode-Aware Wear Leveling

Static wear leveling prevents uneven wearing among blocks due to cold data sitting in one block for a long time while other blocks undergo many P/E cycles. Similarly to the above-described garbage collection, wear leveling in the AxFTL in accordance with an embodiment of the present disclosure takes different erase modes into account. The wear leveling in the AxFTL in accordance with an embodiment of the present disclosure is another mechanism to balance the demand and supply of free blocks in each mode by moving blocks in a less demanded mode into a more demanded mode.

Figure 11:
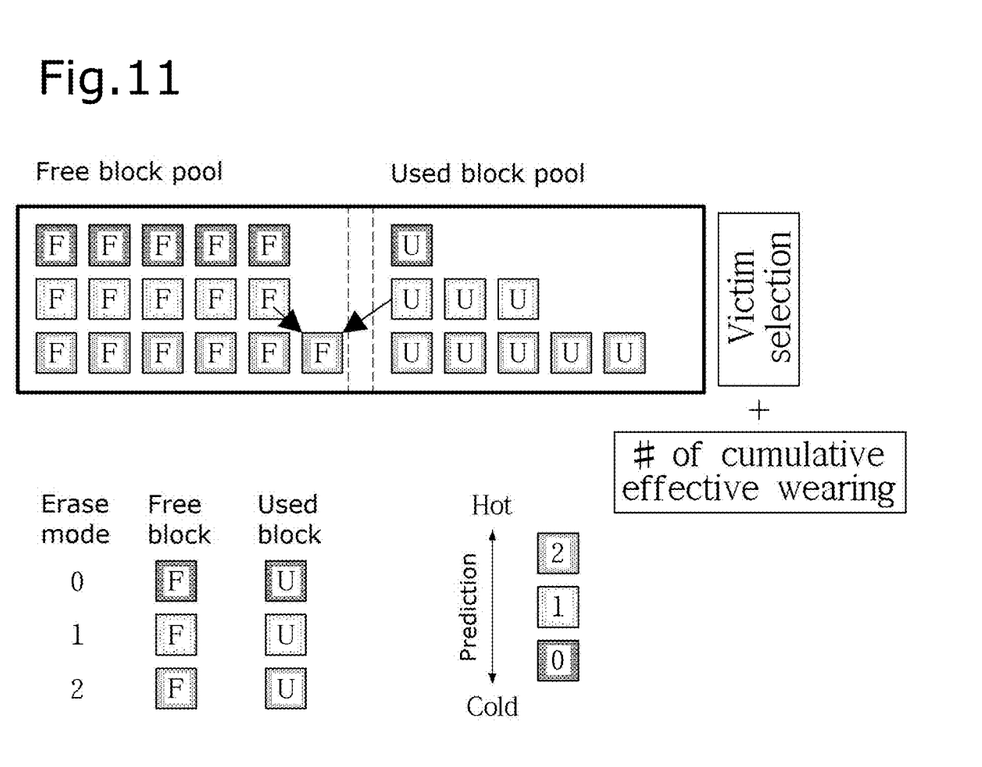
FIG. 11 illustrates selection of a victim block associated with cumulative effective wearing.

Algorithm 2 describes how a potential victim block $b_{victim}$ is selected for wear leveling. Unlike conventional FTLs, the AxFTL in accordance with an embodiment of the present disclosure should consider not only UBPs but also FBPs to select the victim block. That is because a free block can be unused for a long time if no write request with a matching error tolerance is received. Therefore, as shown in Table 2, the victim block $b_{victim}$ that has the lowest CEW from all UBPs and FBPs that satisfy N (FBP)≥$N_{min}$ (lines 1 to 4) is selected. If the difference between the CEW of $b_{victim}$ and the highest CEW is greater than a threshold $\Delta CEW_{th}$, wear leveling is invoked for the selected $b_{victim}$ (lines 5 and 6). FIG. 11 illustrates an example in which a victim block for wear leveling is selected by Algorithm 2 described above.

TABLE 2

Algorithm 2: Selection of Victim Block for Wear leveling

| | |
|---|---|
| 1 | $b_{victim} \leftarrow$ NULL |
| 2 | for each block b in all UBPs and FBPs that N(FBP) ≥ $N_{min}$ do |
| 3 | \| if CEW(b) ≤ CEW($b_{victim}$) then |
| 4 | \| \| $b_{victim} \leftarrow$ b |
| 5 | if $CEW_{max}$ − CEW($b_{victim}$) > $\Delta CEW_{th}$ then |
| 6 | \| Call Algorithm 3 |

Algorithm 3 shows how the erase mode-aware wear leveling is performed for the selected $b_{victim}$. The objective of this algorithm is to bring $b_{victim}$ into the FBP of the most demanded mode so that it can be used soon. If $b_{victim}$ is not a free block, all valid pages, if any, in the block are migrated to a precise (Mode 0) block to prevent additional errors, erased in Mode $m_{hot}$, and moved into $FBPm_{hot}$ (lines 1 to 5). If $b_{victim}$ is a free block, it is moved into $FBPm_{hot}$ with or without re-erase (lines 6 to 10). In case that the erase mode of $b_{victim}$ greater than $m_{hot}$, it is re-erased in Mode $m_{hot}$ to meet the error tolerance requirement of $FBPm_{hot}$ (lines 8 and 9). If $b_{victim}$ is already a free block in $FBPm_{hot}$, no action is taken because it is expected to be allocated soon.

TABLE 3

Algorithm 3: Erase Mode-Aware Wear Leveling

| | |
|---|---|
| 1 | if $b_{victim}$ is not a free block then |
| 2 |   if NUMVALPAGE($b_{victim}$) > 0 then |
| 3 |     MIGRATE($b_{victim}$, Mode 0) |
| 4 |   ERASE($b_{victim}$, $m_{hot}$) |
| 5 |   MOVE $b_{victim}$ into $FBP_{m_{hot}}$ |
| 6 | else |
| 7 |   if $m_{victim} \neq m_{hot}$ then |
| 8 |     if $m_{victim} > m_{hot}$ then |
| 9 |       ERASE($b_{victim}$, $m_{hot}$) |
| 10 |       MOVE $b_{victim}$ into $FBP_{m_{hot}}$ |

Although various embodiments have been described for illustrative purposes, it will be apparent to those skilled in the art that various changes and modifications may be made without departing from the spirit and scope of the invention as defined in the following claims.

What is claimed is:

1. A managing method for a flash storage, the method comprising:
sorting a plurality of blocks within the flash storage into precise blocks and imprecise blocks; and
managing the sorted blocks as a plurality of free block pools,
wherein the management includes performing garbage collection and wear leveling, and
wherein the wear leveling is performed based on CEW (Cumulative Effective Wearing), the CEW indicating cumulative cell damage induced by performing a plurality of operations on a specific block,
wherein the plurality of free block pools correspond to a plurality of error tolerance levels, respectively, and a free block is selected from a corresponding one of the free block pools meeting an error tolerance requirement.

2. The managing method of claim 1, wherein the management is performed to maintain target numbers of the precise and imprecise blocks while ensuring even block wearing.

3. The managing method of claim 1, wherein deep erase and shallow erase are performed on each of the precise blocks and each of the imprecise blocks, respectively.

4. The managing method of claim 3, wherein a voltage applied during the shallow erase is lower than a voltage applied during the deep erase.

5. The managing method of claim 3, wherein a plurality of voltages are applied to divide the shallow erase into a plurality of steps, the plurality of steps corresponding to a plurality of erase modes, respectively.

6. The managing method of claim 1, wherein, when shallow erase or deep erase is performed on the selected block, an erase mode is determined based on a current size of the corresponding one of the free block pools and recent request history.

7. The managing method of claim 1, wherein incremental step pulse programming is performed in a P/E (Program/Erase) cycle.

8. The managing method of claim 7, wherein the incremental step pulse programming is performed on a first block among the imprecise blocks during a first time interval and on a second block among the precise blocks during a second time interval, the first time interval being shorter time interval than the second time interval.

9. The managing method of claim 1, wherein a first block among the precise blocks and a second block among the imprecise blocks are allocated to allow different error rates.

10. The managing method of claim 1, wherein the CEW is obtained based on a first weight of shallow erase and a second weight of deep erase, and
wherein the first weight of the shallow erase is different from the second weight of the deep erase.

11. The managing method of claim 1, wherein a least demanded mode and a most demanded mode are determined based on a number of write requests and a number of remaining free blocks in each of the plurality of free block pools, and the garbage collection is performed by moving a block from the least demanded mode to the most demanded mode.

* * * * *